(12) United States Patent
Sonnenkalb et al.

(10) Patent No.: US 7,497,419 B2
(45) Date of Patent: Mar. 3, 2009

(54) CARBURETOR HAVING A COUPLING ELEMENT AND A COUPLING ELEMENT FOR CONNECTING AN ACTUATING ELEMENT TO AN ADJUSTING ELEMENT

(75) Inventors: Thomas Sonnenkalb, Rudersberg (DE); Steffen Joos, Murr (DE); Heinz Hettmann, Schorndorf (DE); Juner Bytygi, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 157 days.

(21) Appl. No.: 11/709,095

(22) Filed: Feb. 22, 2007

(65) Prior Publication Data
US 2007/0209409 A1 Sep. 13, 2007

(30) Foreign Application Priority Data
Mar. 9, 2006 (DE) .................. 10 2006 010 922

(51) Int. Cl.
*F02M 7/12* (2006.01)
(52) U.S. Cl. .......................... 261/65; 74/491
(58) Field of Classification Search ............ 261/52, 261/64.1, 64.2, 65; 74/491, 503, 504, 510
See application file for complete search history.

(56) References Cited

U.S. PATENT DOCUMENTS

| | | | | |
|---|---|---|---|---|
| 1,774,725 A | * | 9/1930 | Remington | 261/44.7 |
| 2,393,440 A | * | 1/1946 | Wirth | 123/179.16 |
| 3,214,150 A | * | 10/1965 | Rice | 261/62 |
| 3,275,306 A | * | 9/1966 | Phillips | 261/35 |
| 3,784,174 A | * | 1/1974 | Tarnofsky | 261/65 |
| 4,177,784 A | * | 12/1979 | Tatsutomi et al. | 123/179.18 |
| 5,078,111 A | * | 1/1992 | McCann | 123/400 |
| 5,215,049 A | * | 6/1993 | Wolf | 123/179.18 |
| 6,125,547 A | | 10/2000 | Nagashima | |
| 6,708,959 B1 | * | 3/2004 | Dow | 261/65 |
| 7,427,057 B1 | * | 9/2008 | Kampman et al. | 261/52 |
| 2003/0071371 A1 | * | 4/2003 | Morris | 261/65 |

FOREIGN PATENT DOCUMENTS

JP 63-38674 A * 2/1988

* cited by examiner

*Primary Examiner*—Richard L Chiesa
(74) *Attorney, Agent, or Firm*—Walter Ottesen

(57) ABSTRACT

A carburetor (1) has an adjusting element which is mounted in an intake channel (3). An actuating element (19) is provided for actuating the adjusting element. The carburetor (1) has a coupling element for connecting the actuating element (19) to the adjusting element. The coupling element has a receptacle (23, 43) for the actuating element (19). In the receptacle (23, 43), the actuating element (19) is held moveable in its longitudinal direction opposite to the actuating direction (35). The coupling element has an access opening which makes the receptacle (23, 43) accessible at the periphery. An unintended unhooking of the actuating element (19) out of the coupling element is avoided when the access opening has an access slot (26) which extends at an angle to the receptacle (23) up to the receptacle (23). The access slot (26) is connected to the receptacle (23) via at least one connecting slot (31, 32).

7 Claims, 2 Drawing Sheets

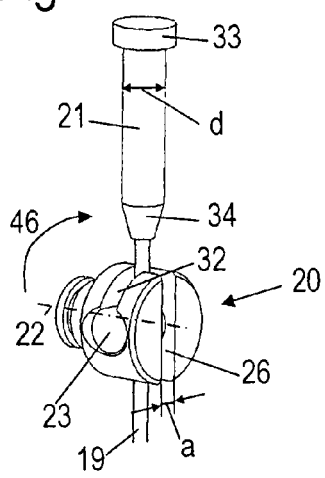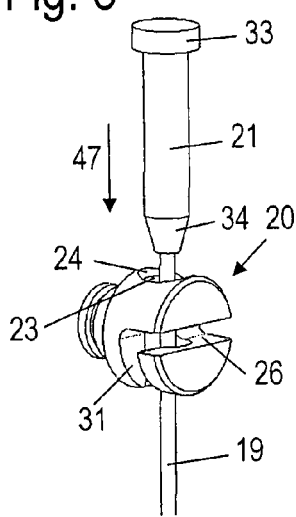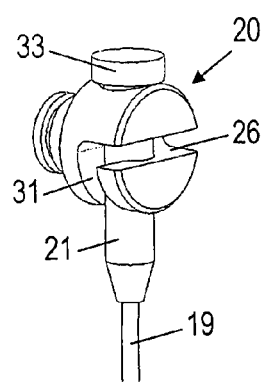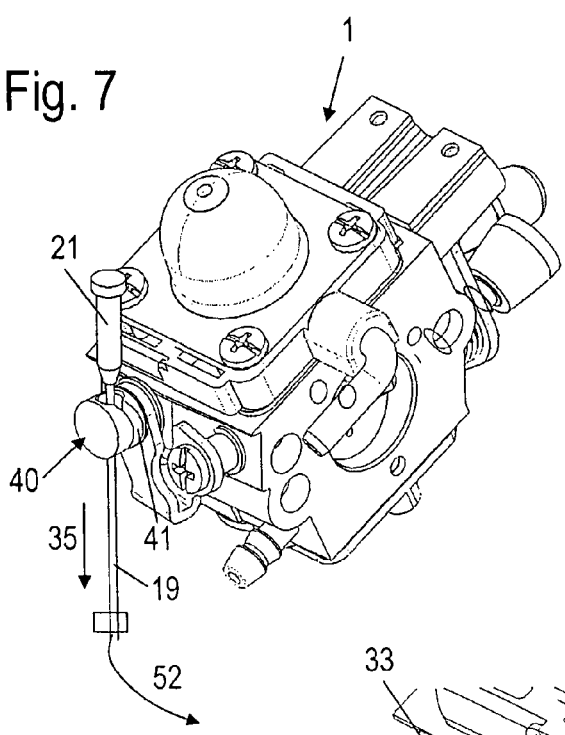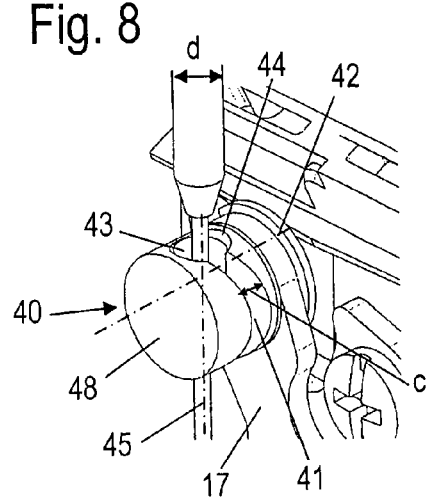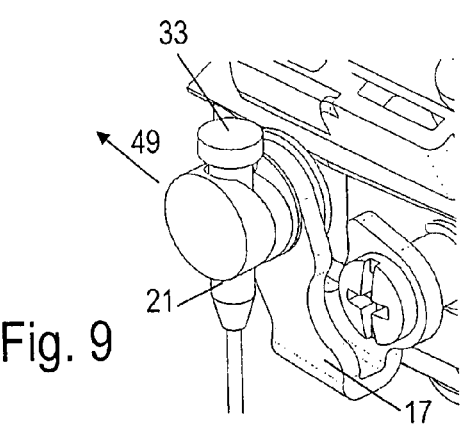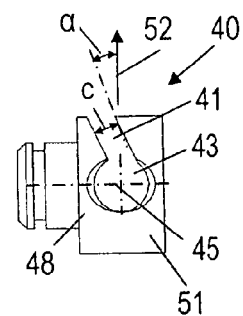

CARBURETOR HAVING A COUPLING ELEMENT AND A COUPLING ELEMENT FOR CONNECTING AN ACTUATING ELEMENT TO AN ADJUSTING ELEMENT

CROSS REFERENCE TO RELATED APPLICATION

This application claims priority of German patent application no. 10 2006 010 922.8, filed Mar. 9, 2006, the entire content of which is incorporated herein by reference.

FIELD OF THE INVENTION

The invention relates to a carburetor having an adjusting element which is mounted in an intake channel and having an actuating element for actuating the adjusting element. The carburetor further includes a coupling element for connecting the actuating element to the adjusting element. The coupling element has a receptacle for the actuating element in which the actuating element is moveably held in its longitudinal direction in opposition to the actuating direction of the actuating element. The coupling element has an access opening via which the receptacle is accessible at the periphery. The invention also relates to a coupling element for connecting an actuating element to the adjusting element.

BACKGROUND OF THE INVENTION

It is known to couple an actuating element such as a throttle pull to an adjusting element in the intake channel via a coupling pin. Coupling pins of this kind usually have a cylindrical receptacle which is accessible via a transverse slot in the end face of the pin. The transverse slot runs parallel to the receptacle. The slot is configured to be narrower than the receptacle so that the throttle pull can be radially introduced into the receptacle. With a movement of the throttle pull in the longitudinal direction, a thickened region of the throttle pull comes to rest in the receptacle and is fixed therein. The throttle pull can move in the receptacle in a direction opposite to its pull direction. The coupling element is moved in the pull direction of the throttle pull with a movement of the adjusting element without pull on the throttle pull, for example, during an adjustment of the throttle element because of the actuation of a choke element. The thickened region of the throttle pull can slip out of the receptacle in this way. The throttle pull can be unintentionally unhooked from the coupling element with an additional movement of the throttle pull in a direction toward the slot in the coupling pin.

U.S. Pat. No. 6,125,547 discloses a coupling device between a throttle pull and a coupling lever wherein, at the end of the throttle pull, a cylindrical body is mounted having a periphery at which the throttle pull exits. The cylindrical body is mounted in its axial direction in a receptacle, that is, perpendicular to the pull direction of the throttle pull. A movement of the throttle pull opposite to the pull direction of the throttle pull in the receptacle is no longer possible for this kind of arrangement so that a movement of the throttle element is hindered without actuation of the throttle pull.

SUMMARY OF THE INVENTION

It is an object of the invention to provide a carburetor of the kind described above wherein an unintentional unhooking or dislodgement of the actuating element is avoided. It is a further object of the invention to provide a coupling element which avoids an unintended unhooking of an actuating element.

The carburetor of the invention includes: an intake channel; an adjusting element mounted in the intake channel; an actuating element for actuating the adjusting element when the actuating element is activated in a predetermined actuating direction; the actuating element defining a longitudinal direction; a coupling element for connecting the actuating element to the adjusting element; the coupling element having a receptacle for receiving the actuating element therein so as to moveably hold the actuating element in the longitudinal direction opposite the actuating direction; the coupling element having an access slot for facilitating access to the receptacle; the access slot extending at an angle to the receptacle; and, the coupling element further having at least one connecting slot for connecting the access slot to the receptacle.

The access opening has an access slot running at an angle to the receptacle in order to prevent an unintended unhooking of the actuating element. The access slot extends up to the receptacle and is connected to the receptacle via at least one connecting slot. For unhooking, the actuating element must be rotated in a direction running transversely to pull direction because of the arrangement of the access slot at an angle to the receptacle or, the coupling element must be rotated relative to the actuating element. An unhooking of the actuating element because of a movement of the actuating element in longitudinal direction thereof is not possible. In this way, an unintended unhooking of the actuating element is avoided.

Advantageously, the connecting slot extends in a radial direction to the receptacle and at an angle to the access slot. The receptacle is advantageously configured to be closed on the side lying opposite to the connecting slot. Advantageously, two connecting slots are provided. In this way, a symmetrical arrangement is achieved.

To avoid an unintentional unhooking of the actuating element out of the coupling element, the actuating element is guided in a first direction away from the carburetor and the access opening defines an angle of less than 45° viewed in the actuating direction of the actuating element. The above first direction lies at an angle to the actuating direction on the coupling element.

Because of the inherent elasticity of the actuating element, the actuating element is pressed in the direction lying opposite to the first direction. Because the access opening defines an angle of less than 45° with the first direction, the actuating element is pressed away from the access opening into the receptacle. In this way, the situation is avoided that the actuating element can become unintentionally unhooked via the access opening.

Viewed in the actuation direction of the actuating element, the access opening defines an angle of less than 30° with the first direction. The receptacle is configured so as to be closed on the side lying opposite to the access opening. A simple manufacture is provided when the access opening is configured as an access slot which runs especially parallel to the actuating direction of the actuating element.

The coupling element advantageously has a cylindrical base body in which the receptacle is formed. The access slot extends from the periphery of the base body up to the receptacle.

The actuating element has a stop in order to ensure a moveability of the actuating element opposite to the actuating direction of the actuating element and, at the same time, to ensure a reliable actuation of the adjusting element. The stop limits the movement of the actuating element in the receptacle in the actuating direction. It is practical that the actuating element has a region with an enlarged diameter to achieve a reliable holding of the actuating element in the receptacle.

This region is arranged in the receptacle and the minimum width of the access opening is less than the enlarged diameter of the actuating element.

In order to provide a reliable actuation in each position of the adjusting element, the coupling element is rotatable relative to the adjusting element about a rotational axis perpendicular to the actuating direction of the actuating element. In addition, for a coupling element having an access slot, which is connected to the receptacle via connecting slots, the rotatability of the coupling element makes possible a simple hooking in and hooking out of the actuating element via a rotation of the coupling element. The longitudinal direction of the actuating element need therefore not be changed for hooking in.

A coupling element for connecting an actuating element to an adjusting element has a receptacle for the actuating element and an access opening via which the receptacle is accessible at the periphery. For this coupling element, the access opening has an access slot which extends at an angle to the receptacle. The access slot is connected to the receptacle via at least one connecting slot.

The access slot is arranged at an angle to the receptacle and ensures a reliable holding of the actuating element in the receptacle and prevents the actuating element from unintentionally becoming unhooked from the coupling element with a movement of the actuating element opposite to the actuating direction.

Advantageously, the connecting slot runs in a radial direction to the receptacle and at an angle to the access slot. The actuating element can be brought out of the access slot into the receptacle with a rotation of the coupling element because the connecting slot runs in a radial direction to the receptacle. A movement of the actuating element is not absolutely necessary.

BRIEF DESCRIPTION OF THE DRAWINGS

The invention will now be described with reference to the drawings wherein:

FIGS. 4 to 6 show perspective views of the steps for hooking in an actuating element into the coupling element of FIG. 3;

FIG. 7 is a schematic perspective view of a carburetor according to another embodiment of the invention;

FIG. 8 shows an enlarged perspective view of the coupling element of the carburetor of FIG. 7;

FIG. 9 shows the coupling element of FIG. 8 with a hooked in actuating element; and, FIG. 10 is a schematic plan view of the coupling element of FIGS. 7 to 9.

DESCRIPTION OF THE PREFERRED
EMBODIMENTS OF THE INVENTION

Figure 1:
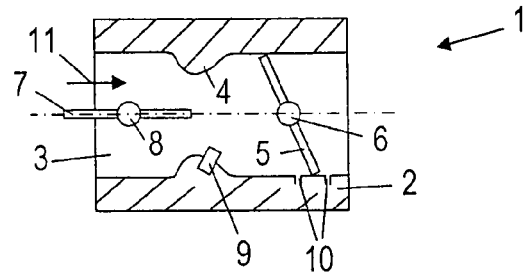
FIG. 1 is a schematic showing a section view through a carburetor.

The carburetor 1 shown in FIG. 1 has a carburetor housing 2 showing a section of the intake channel 3 guided therein. A venturi 4 is configured in the intake channel 3 and a main fuel opening 9 opens into the intake channel 3 in the region of the venturi. Referred to the flow direction 11 in the intake channel 3, a choke flap 7 having a choke shaft 8 is pivotally mounted in the intake channel 3 upstream of the main fuel opening 9. A throttle flap 5 having a throttle shaft 6 is pivotally mounted downstream of the main fuel opening 9. Two ancillary fuel openings 10 open into the intake channel 3 in the region of the throttle flap 5.

Figure 2:
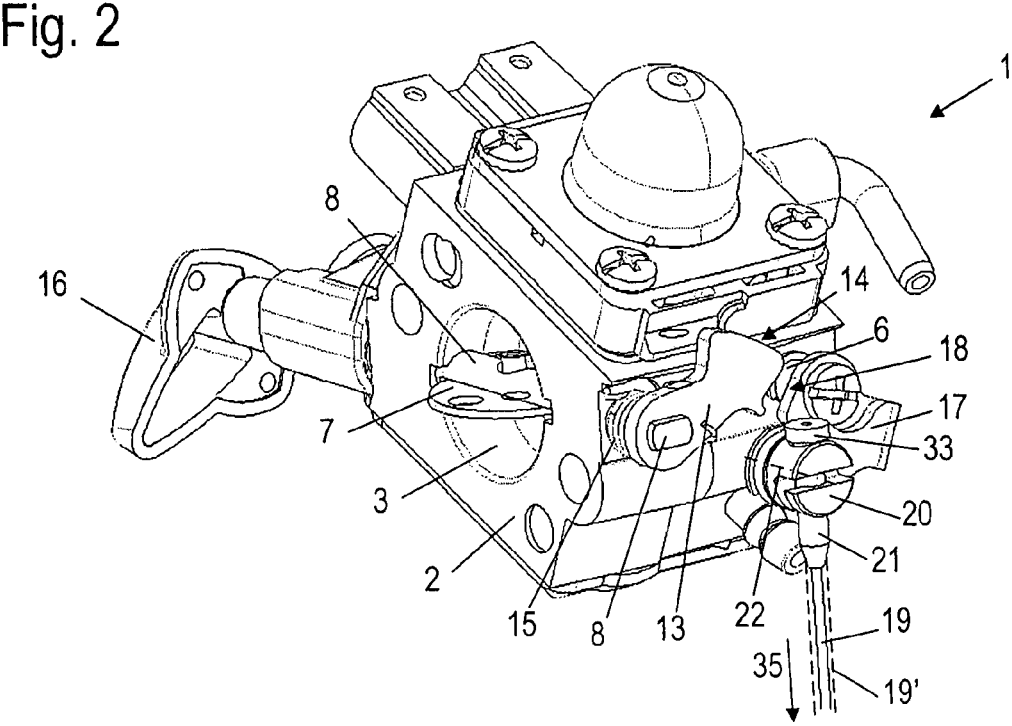
FIG. 2 is a perspective view of the carburetor.

In FIG. 2, a perspective view of the carburetor 1 is shown. A throttle lever 17 is fixed to the throttle shaft 6 so as to be rotatable therewith. A carburetor pin 20 is rotatably journalled on the throttle lever 17 about a rotational axis 22. The rotational axis 22 is at a spacing to the rotational axis of the throttle shaft 6. The rotational axis 22 runs perpendicularly to the plane of the throttle lever 17 and is advantageously approximately parallel to the longitudinal axis of the throttle shaft 6. An actuating element 19 for actuating the throttle flap 5 is held on the carburetor pin 20. A throttle pull is shown as the actuating element in FIG. 2. However, the throttle linkage 19' indicated in phantom outline in FIG. 2 can also be provided. The actuating element 19 is held with a sleeve 21 in the carburetor pin 20. At the end of the actuating element 19, a thickened stop 33 is formed with which the actuating element 19 lies against the periphery of the carburetor pin 20. The actuating element 19 is actuated in the actuating direction 35 to actuate the throttle flap 5. The stop 33 presses against the carburetor pin 20 and pivots the throttle shaft 6. In the opposite direction, the throttle shaft 6 is spring loaded so that a resetting of the adjusting element takes place because of the force of a spring (not shown).

An operator-controlled element 16 is fixed on the choke shaft 8 and, with this operator-controlled element 16, the position of the choke flap 7 is adjusted. The choke shaft 8 is spring biased to its completely open position shown in FIGS. 1 and 2 via a spring 15. A choke lever 13 is fixed to the choke shaft 8 so as to rotate therewith. The choke lever 13 has a cam contour 14 which coacts with a cam contour 18 on the throttle lever 17 when the choke element is actuated and moves the throttle flap 5 into a start position. The throttle flap 5 is opened and the carburetor pin 20 moves in actuating direction 35 while the actuating element 19 is not moved.

Figure 3:
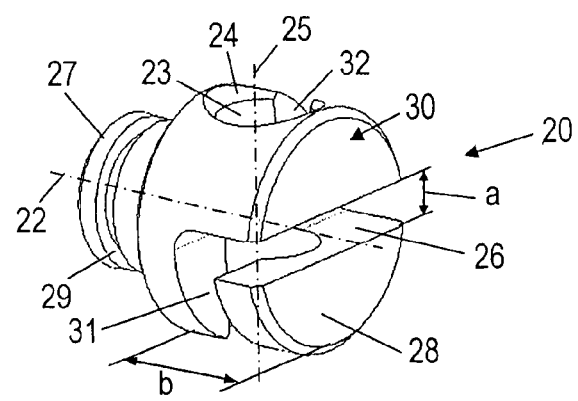
FIG. 3 is an enlarged perspective view of the coupling element of the carburetor of FIG. 2.

The carburetor pin 20 is shown enlarged in FIG. 3. The carburetor pin 20 has a receptacle 23 in which the sleeve 21 of the actuating element 19 is arranged as shown in FIG. 2. A bevel 24 is provided on the receptacle 23 which lies next to the stop 33 (FIG. 2).

The carburetor pin 20 has a cylindrical base body 28. The rotational axis 22 is coincident with the symmetry axis of the cylinder which forms the base body 28. A bearing pin 27 is fixed on the base body 28. The base body 28 is especially configured as one piece with the bearing pin 27. For rotatable mounting, the bearing pin 27 has a peripheral slot 29 in which the bearing pin 27 can be fixed via a ring or the like to the throttle lever 17.

The receptacle 23 is configured to be cylindrical and has a longitudinal axis 25 which lies perpendicular to the rotational axis 22 and parallel to the actuating direction 35 of the actuating element 19. The carburetor pin 20 has an access slot 26 which runs in a plane lying parallel to the rotational axis 22 and lying perpendicular to the longitudinal axis 25. The access slot 26 extends from the end face 30 of the base body 28 up to the receptacle 23. The end face 30 lies facing away from the bearing pin 27. The access slot 26 has a width (a). The carburetor pin 20 has a first connecting slot 31 and a second connecting slot 32 and each extends over 90° of the periphery of the carburetor pin 20. The connecting slots 31 and 32 form circular segments lying opposite each other and these circular segments connect the access slot 26 to the receptacle 23. Both access slots 31 and 32 lie in a plane which is perpendicular to the rotational axis 22 and which includes the longitudinal axis 25 of the receptacle 23. The base body 28 has a width (b) in the direction of the rotational axis 22. The receptacle 23 and the two connecting slots 31 and 32 extend in the center region of the width (b) of the base body 28.

The hooking in of the actuating element 19 on the carburetor pin 20 is shown in FIGS. 4 to 6. As FIG. 4 shows, the actuating element 19 is guided via the access slot 26 into the plane of the receptacle 23. The sleeve 21 has a diameter (d) which is greater than the width (a) of the access slot 26. When hooking in the actuating element 19, the sleeve 21 lies above the carburetor pin 20. The carburetor pin 20 is rotated about the rotational axis 22 in the direction of arrow 46 by 90° when the actuating element 19 is disposed in the plane of the connecting slots 31 and 32. In this way, the actuating element 19 comes to rest in the receptacle 23 as shown in FIG. 5.

An insert bevel 34 is provided on the sleeve 21 on the end thereof facing toward the actuating element 19. To fix the actuating element 19 in the receptacle 23, the actuating element 19 is pulled into the receptacle 23 in the direction of the arrow 47. The bevel 24 and the insert bevel 34 ensure a simple threading in of the sleeve 21 into the receptacle 23. After the movement of the actuating element 19 in the direction of the arrow 47, the actuating element 19 is fixed in the carburetor pin 20 as shown in FIG. 6. The stop 33 lies against the periphery of the carburetor pin 20.

When the carburetor pin during operation is moved in the actuating direction 35 of the actuating element 19 opposite to the actuating element 19, the actuating element cannot become unintentionally unhooked because the access slot 26 is arranged at an angle relative to the receptacle 23. In the embodiment, the access slot 26 and the receptacle 23 are arranged at right angles to each other. The access slot 26 can also be at another angle relative to the receptacle 23. The angle between the access slot 26 and the receptacle 23 lies between 0° and 180° and advantageously lies between 5° and 175°. A lateral unhooking of the actuating element 19 from the receptacle 23 is prevented because the receptacle 23 is closed on the sides lying opposite the connecting slots 31 and 32, respectively.

FIGS. 7 to 10 show an embodiment of a carburetor pin 40. The actuating element 19 is guided away from the carburetor pin 40 in a first direction 52. The first direction 52 lies at an angle to the actuating direction 35 of the actuating element 19. In this way, the actuating element 19 is pressed in the carburetor pin 40 in a direction opposite to the first direction 52.

As shown in FIG. 8, the carburetor pin 40 has a receptacle 43 which is accessible via an access slot 41. The access slot 41 runs parallel to the actuating direction 35 shown in FIG. 7. The carburetor pin 40 has a cylindrical base body 48. The access slot 41 opens at the periphery of the cylindrical base body 48. The carburetor pin 40 is held on the throttle lever 17 so as to be rotatable about a rotational axis 42. The rotatable axis 42 is coincident with the axis of symmetry of the base body 48 of the carburetor pin 40. The receptacle 43 has a bevel 44 at the end facing toward the stop 33. The longitudinal axis 45 of the receptacle 43 runs perpendicular to the rotational axis 42 and in the actuating direction 35.

To hook in the actuating element 19 into the carburetor pin 40, the actuating element 19 is guided via the slot 41 into the receptacle 43. The slot 41 has a width (c) which is less than the diameter (d) of the sleeve 21 on the actuating element 19. The sleeve 21 is arranged above the carburetor pin 40 when guiding the actuating element 19 into the receptacle 43. For fixing, the actuating element 19 is pulled in the actuating direction 35 so that the sleeve 21 goes into the receptacle 43 and the stop 33 lies against the periphery of the base body 48.

As the plan view of the carburetor pin 40 in FIG. 10 shows, the slot 41 is inclined at an angle α relative to the direction 52. FIG. 10 shows a side view of the carburetor pin 40 in the actuating direction 35 of the actuating element 19. The receptacle 43 is configured to be closed on the side 51 lying opposite to the access slot 41.

The actuating element 19, especially a throttle pull, is guided away in the first direction 52. For this reason, the actuating element 19 is pressed because of its inherent elasticity in the direction of the arrow 49 (FIG. 9) to the side 51 of the receptacle 43 shown in FIG. 10. In this way, an unintended dislodgement or unhooking of the actuating element is prevented even with a relative movement between the carburetor pin 40 and the actuating element 19.

It is understood that the foregoing description is that of the preferred embodiments of the invention and that various changes and modifications may be made thereto without departing from the spirit and scope of the invention as defined in the appended claims.

What is claimed is:

1. A carburetor comprising:
   an intake channel;
   an adjusting element mounted in said intake channel;
   an actuating element for actuating said adjusting element when said actuating element is activated in a predetermined actuating direction;
   said actuating element defining a longitudinal direction;
   a coupling element for connecting said actuating element to said adjusting element;
   said coupling element having a receptacle for receiving said actuating element therein so as to moveably hold said actuating element in said longitudinal direction opposite said actuating direction;
   said coupling element having an access slot for facilitating access to said receptacle;
   said access slot extending at an angle to said receptacle; and,
   said coupling element further having at least one connecting slot for connecting said access slot to said receptacle.

2. The carburetor of claim 1, wherein said connecting slot extends in a radial direction to said receptacle and at an angle to said access slot.

3. The carburetor of claim 2, wherein said receptacle has a side lying opposite to said connecting slot; and, said receptacle is configured to be closed at said side lying opposite to said connecting slot.

4. The carburetor of claim 3, wherein said connecting slot is a first connecting slot and wherein said coupling element has a second connecting slot.

5. The carburetor of claim 1, wherein said actuating element has a stop for limiting the movement of said actuating element in said receptacle in said actuating direction.

6. The carburetor of claim 1, wherein said actuating element has a region having an enlarged diameter (d) with said region being disposed in said receptacle; and, said access slot has a minimal width (a, c) less than said enlarged diameter (d) of said actuating element.

7. The carburetor of claim 1, wherein said coupling element defines a rotational axis perpendicular to said actuating direction and said coupling element is rotatable about said rotational axis relative to said adjusting element.

\* \* \* \* \*